United States Patent [19]

Sakai

[11] Patent Number: 4,803,564
[45] Date of Patent: Feb. 7, 1989

[54] ELECTRONIC BLACKBOARD SYSTEM

[75] Inventor: Katsuyoshi Sakai, Kanagawa, Japan

[73] Assignee: Mitsubishi Denki Kabushiki Kaisha, Tokyo, Japan

[21] Appl. No.: 92,427

[22] Filed: Sep. 3, 1987

[30] Foreign Application Priority Data

Sep. 8, 1986 [JP] Japan .............................. 61-211017

[51] Int. Cl.[4] .............................................. H04N 1/10
[52] U.S. Cl. ...................................... 358/294; 434/408
[58] Field of Search .......................... 358/294; 434/408

[56] References Cited

U.S. PATENT DOCUMENTS

| 4,587,568 | 5/1986 | Takayama | 358/293 |
| 4,609,946 | 9/1986 | Thaler | 358/286 |
| 4,725,889 | 2/1988 | Yaniv | 358/294 |
| 4,755,882 | 7/1988 | Toyota | 358/294 |

FOREIGN PATENT DOCUMENTS 57-176767  11/1982  Japan .

Primary Examiner—Howard W. Britton
Attorney, Agent, or Firm—Wolf, Greenfield & Sacks

[57] ABSTRACT

An electronic blackboard system is composed of: angle irons fixed to an information writing board or to a wall surface above the information writing board; a guide rail which is secured to the angle irons and extends horizontally; a driving unit placed on the guide rail, the driving unit moving horizontally; a photoelectric conversion device for converting written information into electrical signals; a memory for storing image information of one picture; a hard-copy device for recording the image information; and a roller secured to the photoelectric conversion device, the roller rolling while in contact with the information writing board. In the thus constructed electronic blackboard system, it is possible to read information written on an existing information writing board which may even be attached to a wall.

21 Claims, 3 Drawing Sheets

Fig. 1
(PRIOR ART)
Fig. 2
(PRIOR ART)
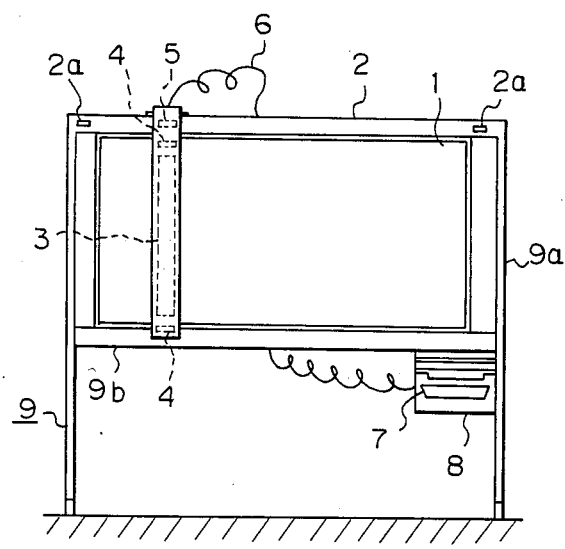
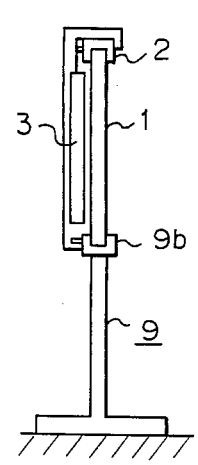
Fig. 3 (PRIOR ART)
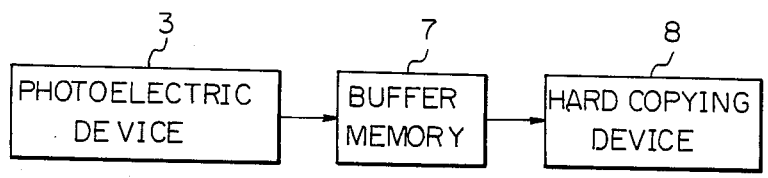

ELECTRONIC BLACKBOARD SYSTEM

BACKGROUND OF THE INVENTION

1. Field of the Invention

The present invention pertains to an electronic blackboard system suited to the production of hard-copy of pieces of information written on an information writing board such as a white board or a blackboard.

2. Description of the Prior Art

FIG. 1 is a front view showing a conventional electronic blackboard system. FIG. 2 is a side view of the electronic blackboard system illustrated in FIG. 1. FIG. 3 is a block diagram showing a flow of signals in the electronic blackboard system of FIG. 1. In the figures, the reference numeral 1 stands from an information writing board; the numeral 2 denotes a guide rail laid horizontally on the upper edge of the information writing board 1; 3 represents a photoelectric conversion device having its one end supported on the guide rail 2 in such a manner that a photoelectric device is movable from side to side, this photoelectric device including a longitudinally formed CCD (Charge Coupled Device) image sensor, a light receiving part disposed in front of this sensor and light emission diodes (LEDs) arranged in a line on the sides of the light receiving part; 4 designates a driving unit, fitted to both ends of the photoelectric device 3, for moving the photoelectric device 3 leftwardly and rightwardly in synchronism with each other; 5 denotes a positional detector consisting of a LED and a photosensor which stand face to face with respect to each other, this positional detector serving to detect the fact that tongue pieces 2a provided at both ends of the guide rail 2 are interposed between the LED and the photosensor; 6 designates a signal cable connected to a power source (not illustrated); 7 stands for a buffer memory for storing image information sent from the photoelectric device 3; 8 denotes a hard-copy device such as a printer or the like; and 9 represents a stand equipped with a vertical frame 9a and a guide rail 9b the vertical frame serving as a supporter for the guide rail 2, the buffer memory 7 and the hard-copy device 8 and the guide rail part 9b supporting the lower end of the driving unit 4, this stand stably supporting the entire system on the floor.

Next, the operation of the conventional electronic blackboard system illustrated in FIG. 1 will be described. In the electronic blackboard system constructed in the above-described manner, the photoelectric device 3 to be employed is of a so-called closely contactual type where the light receiving part and the LEDs are spaced slightly away from an information input face. This device 3 serves to read the information written on the information writing board 1 along the longitudinal lines and convert the thus read information into electrical signals. The photoelectric device 3 is transferred leftwardly or rightwardly at a given velocity by means of the driving unit 4 and is then halted at a position in which the positional detector 5 detects the presence of the tongue pieces 2a, i.e., this device 3 stops at the left or right end of the information writing board 1. In this way, when the photoelectric device 3 is transferred from the left end of the information writing board 1 to the right end thereof and vice versa, the image information equivalent to one picture is obtained from the CCD image sensor which constitutes the photoelectric device 3. Subsequent to the storage of the image information in the buffer memory 7, the image information is recorded by the hard-copy device 8.

The conventional electronic blackboard system is thus constructed, and hence the information writing board 1 and the stand 9 are so disposed as to be constitutively (or essentially) associated with other components like the guide rail 2, the driving unit 4 and so on. The conventional electric blackoard system is prepared for exclusive use and is incapable of enabling read-out from an existing white board or blackboard mounted on a wall.

SUMMARY OF THE INVENTION

It is a primary object of the present invention to obviate the above-described problems by providing an electronic blackboard system suitable for an information writing board such as a white board or a blackboard, even one hanging on a wall, this electronic blackboard system requiring no specially designed information writing board and stand.

To this end, according to one aspect of the invention, there is provided an electronic blackboard system characterized in that: a photoelectric conversion device is movable left and right along a guide rail; right and left angle members for supporting the guide rail are fixed to the information writing board or the wall surface to define a positional correlation between the photoelectric conversion device and the information writing board; and a memory and a hard-copy device are contained in a discrete box.

The electronic blackboard system according to the present invention has the angle members (angle bars) defined as fittings which are attached to the information writing board the angle member supporting the guide rail. With such an arrangement the electronic blackboard system maintains the positional correlation between the photoelectric conversion device and the information writing board with the aid of rollers provided at the lower end. Other objects and advantages of the present invention will become evident on reading the following description taken in connection with the accompanying drawings.

BRIEF DESCRIPTION OF THE DRAWINGS

FIG. 1 is a front view of a conventional electronic blackboard system;

FIG. 2 is a side view of the electronic blackboard system depicted in FIG. 1;

FIG. 3 is a block diagram showing a flow of signals in the electronic blackboard system of FIG. 1;

DESCRIPTION OF THE PREFERRED EMBODIMENT

Figure 4:
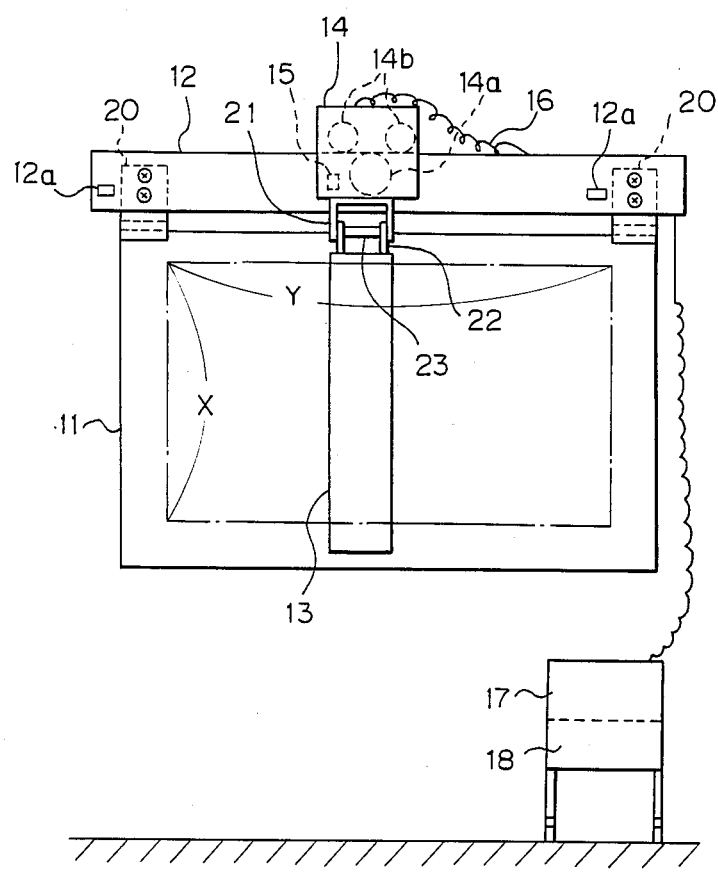
FIG. 4 is a front view of an electronic blackboard system, showing one embodiment of the present invention.
Figure 5:
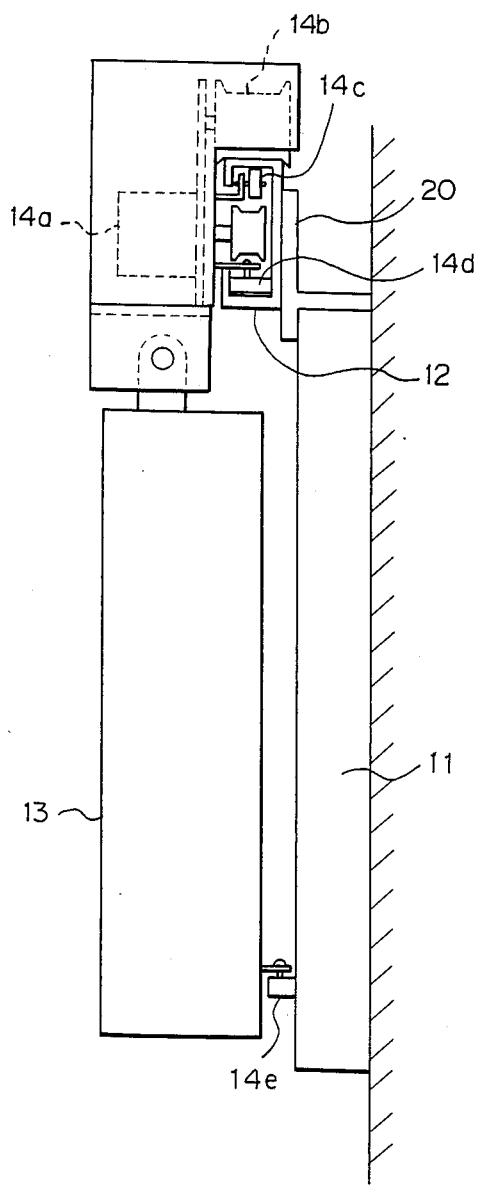
FIG. 5 is a view showing in detail the side surface of the electronic blackboard system illustrated in FIG. 4.

FIG. 4 is a front view of an electronic blackboard system, illustrating one embodiment of the present invention. FIG. 5 is a view illustrating in detail the side surface of the electronic blackboard system of FIG. 4. In FIGS. 4 and 5 the reference numeral 11 denotes an information writing board, the numeral 12 designates a guide rail, 13 stands for a photoelectric conversion device, and 14 represents a driving unit. The driving unit 14 is composed of a motor 14a, a plurality of rollers 14b connected through a power transmission system to this motor 14a idler rollers 14c and 14d and an idler roller 14e provided at the lower end of the photoelectric device 13. The rollers 14b and 14c are so disposed that the guide rail 12 is vertically sandwiched in between these rollers. The roller 14d is laid to serve as a guide in the to-and-fro direction, this roller coming in contact with the inner surface opposite the guide rail 12. The roller 14d rolls while remaining in contact with the guide rail 12.

The numeral 21 represents a bracket provided at the lower portion of the driving unit 14 and the numeral 22 denotes a bracket provided at the upper portion of the photoelectric device 13. The numeral 23 designates a connecting shaft for rotatably connecting these brackets 21 and 22 to each other. The position of placement of the connecting shaft 23 is so set that rotary forces are produced about the connecting shaft 23, these forces acting in the direction in which the photoelectric device 3 approaches the information writing board 11 by virtue of its own weight.

The numeral 15 designates a positional detector, numeral 16 represents a signal cable, 17 denotes a buffer memory, and 18 stands for a hard-copy device. The numeral 20 designates angle irons (angle bars) defined as attachment plates which are fastened to the information writing board 11 with( for instance screws. The rail 12 is secured to the angle irons 20 by employing for example, screws.

In the thus constructed electronic blackboard system according to the present invention, the angle irons 20 are mounted on the information writing board 11. The guide rail 12 is fixed to the angle irons 20. The photoelectric device 13 is attached to the driving unit 15 which travels on the guide rail 12( thereby determining the positioned correlation between the information writing board 11 and the photoelectric conversion device 13.

When this type of electronic blackboard system is fitted to an existing white board or blackboard secured to a wall, there may arise a problem relative to the positional correlation. In either case, the angle irons are attached to the information writing board 11 by moving them up or down or the guide rail 12 is secured to the angle irons 20 by moving it vertically while adjusting the reading region of the information writing board 11, whereby a predetermined reading region XY can be assured. The information writing board 11 and the photoelectric device 13 are disposed with a predetermined spacing between them. This spacing can also be assured by the contact of the roller 14e provided at the lower portion of the photoelectric conversion device 13.

Since the buffer memory 17 and the hard-copy device 18 may be placed on the floor there is no direct association with the blackboard or the white board hanging on the wall.

As clarified by the description given above the present invention provides the following effect: The angle irons are easily mounted on the upper surface of an existing white board or blackboard hanging on a wall to serve as fittings. The guide rail is also easily secured to the angle irons. Thus the positional correlation between the photoelectric device and the information writing board is easily maintained so that the information written on an existing board, even if attached to a wall is readable photoelectrically.

As many apparently widely different embodiments of this invention may be created without departing from the spirit and scope thereof it is to be understood that the invention is not limited to the specific embodiments thereof except as defined in the appended claim.

What is claimed is:

1. An electronic blackboard system comprising:
   an attachment means fixed to the upper portions of an information writing board such as a white board or a blackboard attached to a wall surface or fixed to a wall surface above such an information writing board;
   said attachment means comprising a pair of spacedly disposed angle members each respectively located adjacent an upper corner of the information writing board;
   means securing the angle members to the information writing board in such spaced apart relationship;
   a guide rail secured by said attachment means and horizontally disposed along an upper edge of said information writing board;
   means securing the guide rail at ends thereof to respective angle members;
   a driving unit placed on said rail an moving thereon in the horizontal direction;
   a photoelectric conversion device, connected to said driving unit in such a manner as to face the surface of said information writing board, for reading written information;
   a memory for storing pieces of image information of a whole picture obtained by moving said photoelectric device in the direction intersecting the read-out line;
   a hard-copy device for reading out said image information stored in said memory and recording said image information; and
   a roller secured to the lower end of said photoelectric conversion device, said roller rolling while being in contact with said information writing board.

2. An electronic blackboard system according to claim 1 wherein each angle member has a first leg for attachment to the top surface of the information writing board and a second leg for securing the guide rail thereto.

3. An electronic blackboard system according to claim 2 wherein said first leg is substantially horizontal and said second leg is substantially vertical.

4. An electronic blackboard system according to claim 1 wherein said driving unit includes at least two rollers, and said guide rail is sandwiched therebetween.

5. An electronic blackboard system according to claim 4 further comprising a motor adapted to drive said rollers.

6. An electronic blackboard system according to claim 1 including means for supporting said photoelectric conversion device in a downwardly depending direction from the driving unit, said means for supporting comprising pivot means for enabling the limited rotation of the photoelectric conversion device relative to said driving unit.

7. An electronic blackboard system according to claim 6 wherein said driving unit has roller means at a top end thereof for engagement with said guide rail, said pivot means disposed at a bottom end of the driving unit and below said roller means.

8. An electronic blackboard system according to claim 7 wherein said roller means includes at least one driven roller engaging said guide rail and at least one idler roller disposed within said guide rail.

9. An electronic blackboard means according to claim 8 including a pair of idler rollers mounted in orthogonally directed relative positions.

10. An electronic blackboard system comprising:
   an attachment member fixed to the upper portions of an information writing board such as a white board or a blackboard attached to a wall surface or fixed to a wall surface above such an information writing board;
   a guide rail secured by said attachment member and horizontally disposed along an upper edge of said information writing board;
   a driving unit placed on said rail and moving thereon in the horizontal direction;
   a photoelectric conversion device, connected to said driving unit in such a manner as to face the surface of said information writing board, for reading written information;
   means for supporting said photoelectric conversion device in a downwardly depending direction from a bottom end of said driving unit, said means for supporting comprising pivot means for enabling limited rotation of the photoelectric conversion device relative to said driving unit;
   a memory for storing pieces of image information of a whole picture obtained by moving said photoelectric device in the direction intersecting the read-out line;
   a hard-copy device for reading out said image information stored in said memory and recording said image information; and
   a roller secured to the lower end of said photoelectric conversion device, said roller rolling while being in contact with said information writing board.

11. An electronic blackboard system according to claim 10 wherein said pivot means comprises a first bracket attached to said driving unit, a second bracket attached to said photoelectric conversion device, and shaft means intercoupling said brackets.

12. An electronic blackboard system according to claim 10 wherein said driving unit has roller means at a top end thereof for engagement with said guide rail, said pivot means disposed at a bottom end of the driving unit and below said roller means.

13. An electronic blackboard system according to claim 11 wherein said roller means includes at least one driven roller engaging said guide rail and at least one idler roller disposed within said guide rail.

14. An electronic blackboard system comprising:
   an attachment member fixed to the upper portions of an information writing board such as a white board or a blackboard attached to a wall surface or fixed to a wall surface above such an information writing board;
   a guide rail secured by said attachment member and horizontally disposed along an upper edge of said information writing board;
   a driving unit placed on said rail and moving thereon in the horizontal direction;
   said driving unit comprising a motor, at least one drive roller powered from the motor and disposed for contact with the top of the guide rail, and at least one idler roller disposed within said guide rail;
   a photoelectric conversion device, connected to said driving unit in such a manner as to face the surface of said information writing board, for reading written information;
   a memory for storing pieces of image information of a whole picture obtained by moving said photoelectric device in the direction intersecting the read-out line;
   a hard-copy device for reading out said image information stored in said memory and recording said image information; and
   a roller secured to the lower end of said photoelectric conversion device, said roller rolling while being in contact with said information writing board.

15. An electronic blackboard system according to claim 14 wherein said guide rail is partially closed having a internal area defined therein for acceptance of said idler roller, said driving unit including a pair of drive rollers powered from the motor and spacedly disposed along said guide rail.

16. An electronic blackboard system according to claim 14 wherein said attachment member comprises a pair of spacedly disposed angle members, each respectively located adjacent an upper corner of the information writing board, means securing the angle members to the information writing board in such spaced apart relationship, and means securing the guide rail at ends thereof to respective angle members.

17. An electronic blackboard system according to claim 16 including means for supporting said photoelectric conversion device in a downwardly depending direction from the bottom end of said driving unit, said means for supporting comprising pivot means for enabling limited rotation of the photoelectric conversion device relative to said driving unit.

18. An electronic blackboard system according to claim 14 wherein said guide rail is substantially C-shaped having an internal area defined therein for acceptance of said idler roller.

19. An electronic blackboard system according to claim 18 including a pair of idler rollers both disposed within the internal area of said guide rail and mounted in relative orthogonally directed positions.

20. An electronic blackboard system according to claim 19 wherein one idler roller is disposed at the bottom of the guide rail in substantially horizontally disposed rotation and another idler roller is dispose at the top of the guide rail in substantially vertically disposed rotation.

21. An electronic blackboard system according to claim 20 wherein the top surface of the guide rail has the drive roller disposed thereover and has the other idler roller disposed thereunder.

* * * * *